(No Model.) 3 Sheets—Sheet 3.

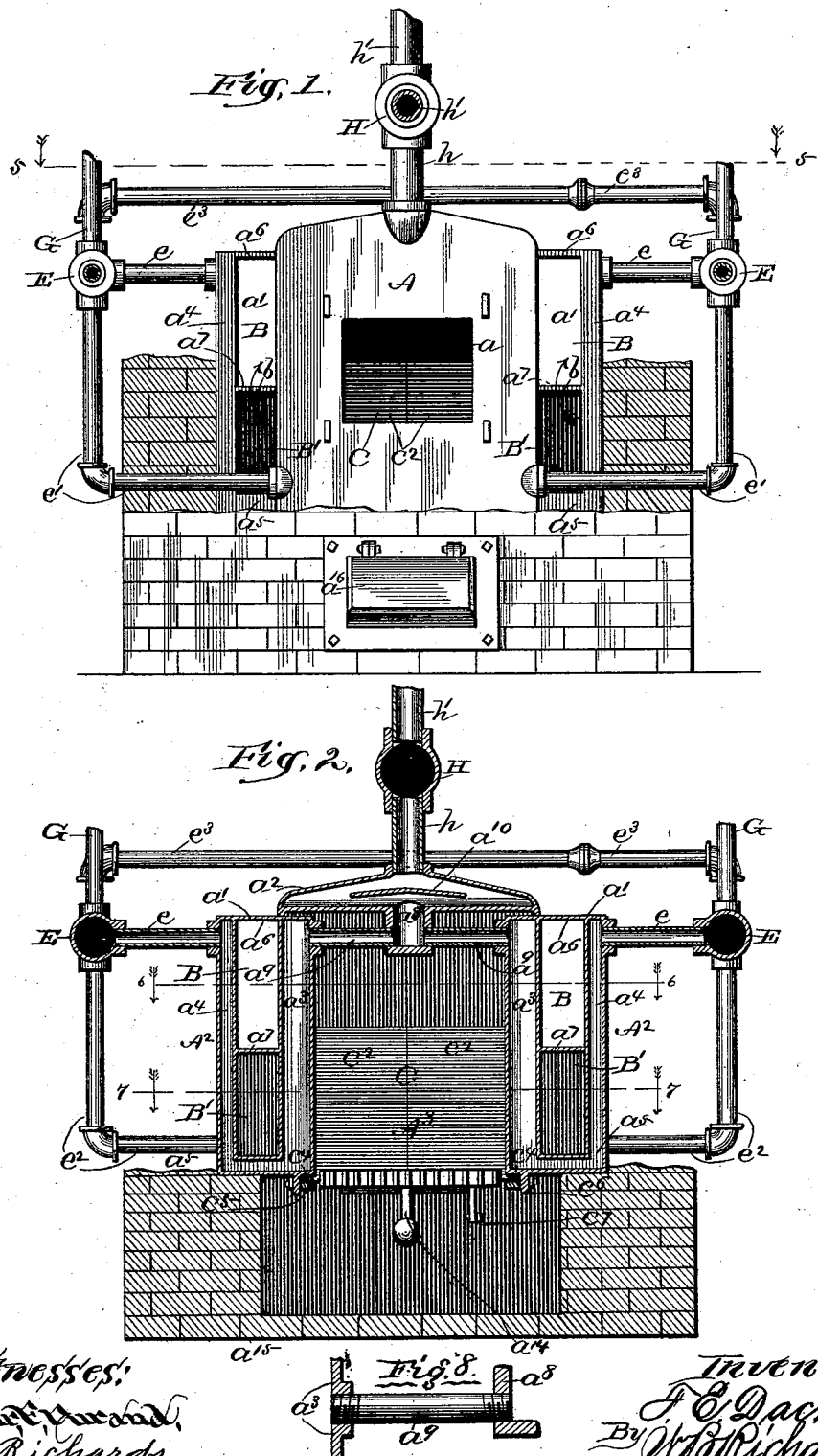

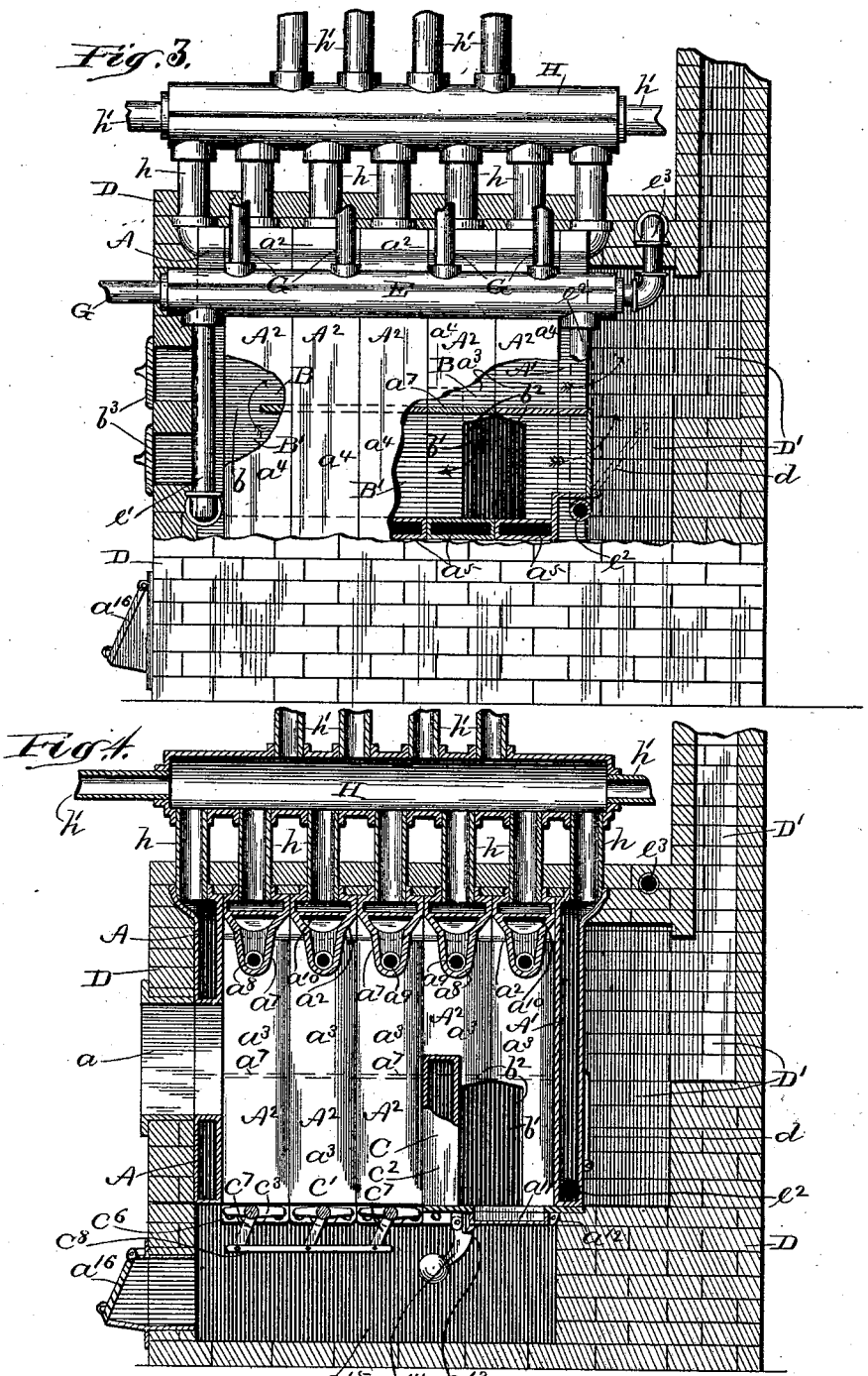

F. E. DACK.
HEATER FOR HOT WATER HEATING SYSTEMS.

No. 517,683. Patented Apr. 3, 1894.

Witnesses:
H. M. Richards.

Inventor:
F. E. Dack
By W. B. Richards
Atty.

UNITED STATES PATENT OFFICE.

FREDERICK E. DACK, OF GALVA, ILLINOIS, ASSIGNOR OF ONE-HALF TO E. K. HAYES, OF SAME PLACE.

HEATER FOR HOT-WATER HEATING SYSTEMS.

SPECIFICATION forming part of Letters Patent No. 517,683, dated April 3, 1894.

Application filed January 6, 1893. Serial No. 457,442. (No model.)

*To all whom it may concern:*

Be it known that I, FREDERICK E. DACK, a citizen of the United States, residing at Galva, in the county of Henry and State of Illinois, have invented certain new and useful Improvements in Furnaces or Heaters for Hot-Water Systems of Heating, of which the following is a specification.

This invention relates to improvements in that class of furnaces or heaters for hot-water systems of heating in which a portion of the system of pipe in which the water circulates constitutes a portion of the furnace, or heater which is the prime source from which heat is derived, and in which water is used as a circulating medium for the absorption, transportation and diffusion of the heat through the instrumentality of such pipe system, and the improvement consists in novel structural features, and combinations of parts, the mutual relationship of which parts in combination will be found hereinafter fully described, and the structural features and combinations of which parts will form the subject matter of the claims hereto appended.

A furnace or heater embodying the constructive forms of, and showing the mutual relationship and combination of the parts forming the subject matter of my improvement, is illustrated in the accompanying drawings, in which—

Figure 5:
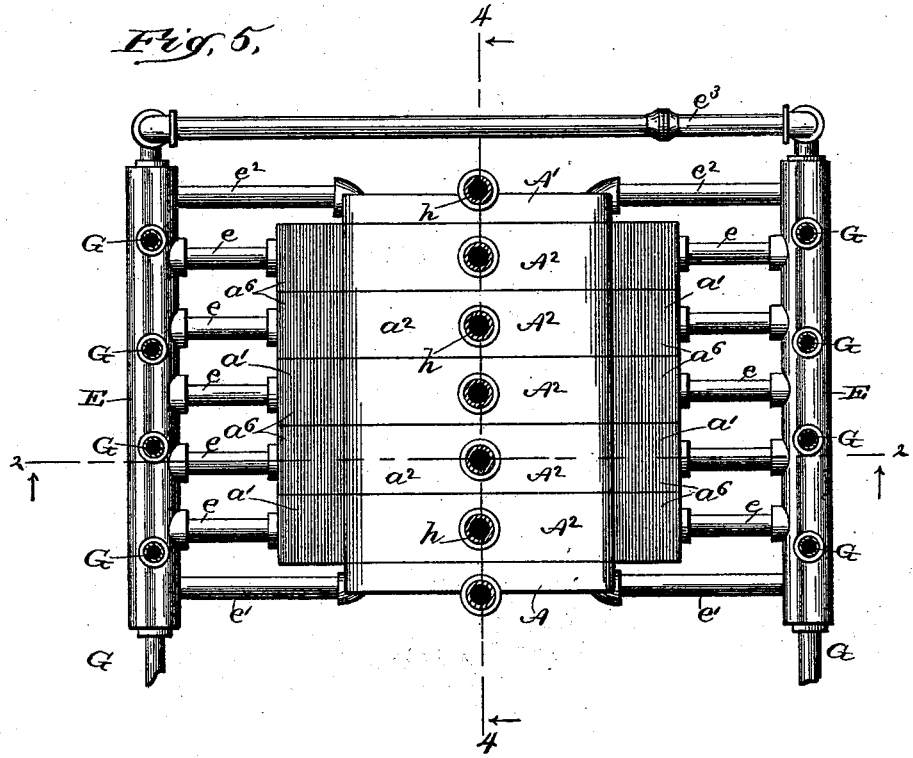
Figure 6:
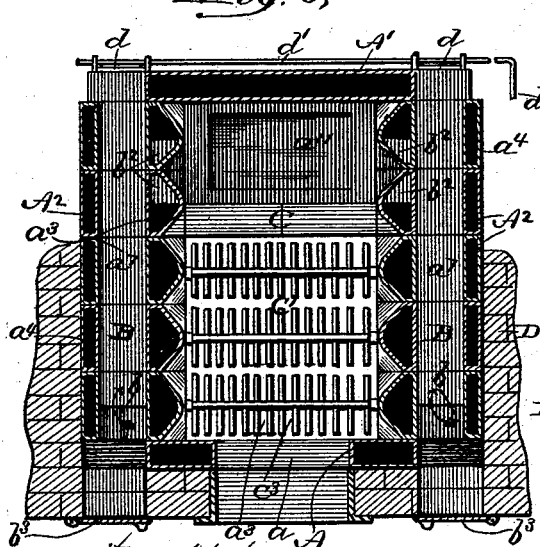
Figure 7:
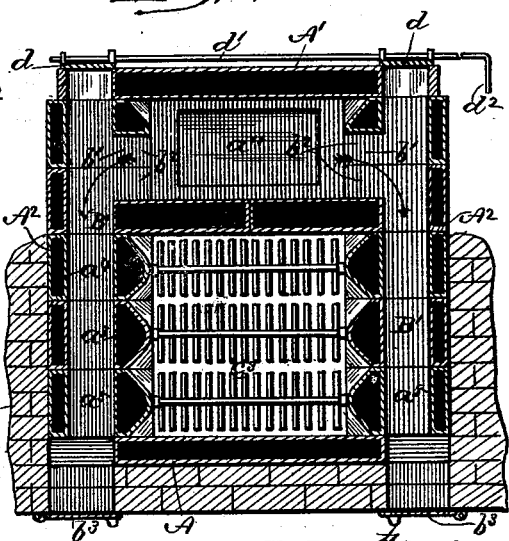

Figure 1 is a front elevation of my furnace, or heater, shown with the fire door and the flue doors removed, and with part of a brick setting; Fig. 2, a transverse sectional elevation in line 2, 2, in Fig. 5, with part of a brick setting; Fig. 3, a side elevation, partly broken away to show interior parts; Fig. 4, a sectional elevation in line 4, 4, in Fig. 5, with part of a brick setting; Fig. 5, a top plan of the main parts of the furnace, and sectional plan of other parts, in line 5, 5, in Fig. 1, without the brick setting; Fig. 6, a sectional plan in a horizontal plane, indicated by the line 6, 6, in Fig. 2; Fig. 7, a sectional plan in a horizontal plane, indicated by the line 7, 7, in Fig. 2; Fig. 8, an enlarged representation of a detail, hereinafter referred to.

That portion of the furnace or heater which constitutes the combustion chamber, the flues for the passage of the flame and other products of combustion, and the sections, or portions or parts of the water pipes subjected directly to the action of the heat, are formed of separate and separable sections consisting of a front section A, a rear section A' and intermediate sections $A^2$. The hollow, front section A is of substantially rectangular form, with its upper central part elevated, as shown, to correspond with the similar elevated central parts of the intermediate sections, and is centrally perforated at $a$ for a fire door or feed door, not shown. The hollow rear section A' is of same general outline as the section A, and constitutes a fire back. Each intermediate section $A^2$ is formed of U-shaped water legs or side parts $a'$ and an upper part $a^2$. When placed as shown in the drawings the water legs or side parts $a'$ form the sides of the combustion chamber $A^3$, and the upper part $a^2$ forms the top thereof, as will be hereinafter fully described. The comparative width of the front and rear sections, and the intermediate sections $A^2$, is preferably as shown at Figs. 1 and 5. Each U-shaped side part $a'$ consists of a larger pipe or hollow water-leg $a^3$, and a smaller pipe or hollow water leg $a^4$, united at their lower ends by a horizontal pipe or part $a^5$, see Fig. 2. The water-leg $a^3$ of each section is preferably of triangular form in its cross section, except at its end portions, whereby it presents an increased area of heating surface for the absorption of heat from the fire in the combustion chamber, and is preferably of cast metal, and integral with the water-leg or pipe $a^4$ and the part $a^5$ which connects the interior of the parts $a^3$ and $a^4$. The parts $a^3$, $a^4$, are connected at their upper ends by a faced plate $a^6$, and at their mid-length portions by a faced partition plate $a^7$, which faced plates $a^6$ are in close contact, as shown at Fig. 1, and faced plates $a^7$ in close contact, as shown at Fig. 6, and faced parts $a^5$ in close contact, as shown at Fig. 7, when the sections $A^2$ are in place together, to form the furnace or heater, as shown in the drawings.

The series of horizontal partition plates $a^7$, as shown, divide the interspace between the series of water legs $a^3$ and a series of parts or pipes $a^4$, into two interspaces, which constitute an upper horizontal flue B, and a lower horizontal flue B', which are made to communicate with each other at their ends next the section A by a plate $a^7$ which is in the section $A^2$ next to the section A, being narrow so as to produce a communicating passage $b$ between the flues B and B′ as shown at Figs. 3 and 6. The hollow upper parts of the sections $A^2$ are preferably flat on their lower sides and arched at their upper sides to conform to the similar formation of the sections A, A′. The part $a^2$ of each section $A^2$ rests with its outer end and base on the parts $a^3$, $a^4$, of the section, and faced and fitted closely together so that when the sections are placed together as shown, the lower portions or bases of the series of parts $a^2$ form a continuous imperforate crown-sheet or crown plate over the combustion chamber. From the mid-length portion of the base of each part $a^2$, a hollow pendant $a^8$ extends downwardly, as shown. The lower ends of the pendants $a^8$ are closed (see Figs. 2 and 4) and their upper hollow parts communicate with the water space in the hollow part $a^2$. The interiors of the pendants $a^8$ are connected by tubes $a^9$ with the interiors of the pipe or parts $a^3$, as shown at Fig. 2. The tubes $a^9$ are screw-threaded at their opposite ends, preferably with oppositely disposed screw-threads, as shown at Fig. 8, whereby they may be screwed into the pipe or part $a^8$ and the pendant $a^3$ simultaneously. The tubes $a^9$ fixedly unite the side parts or pipes $a^3$, $a^4$, and the triangular parts $a^2$. A plate $a^{10}$ extends transversely across the interior of the part $a^2$ a short distance above and over the pendant $a^8$, as shown at Fig. 4, and a short distance lengthwise of the part $a^2$ as shown at Fig. 2, for purposes hereinafter described.

The combustion chamber is provided with a furnace-bridge or bridge-wall $c$ at the end of the fire grate $c'$, which bridge-wall serves in the ordinary manner to quicken the draft by contracting the area of its passage, and to a great extent to prevent fuel being carried into the flues. The hollow plates $c^2$, two of which form the bridge-wall across the lower part of the combustion chamber, extend inwardly, one from each of two water-legs or pipes $a^3$ of the same section $A^2$, and the plates $c^2$ are preferably only about one half the thickness of the parts $a^3$, as shown at Fig. 4, and are cast integral with said pipes or parts $a^3$, and each with its hollow part or water space communicating with the water space of the water leg or part $a^3$ with which it is connected, as shown at same figure.

In the bottom of the combustion chamber, in rear of the bridge-wall $c$ is an imperforate door $a^{11}$, which is hinged at $a^{12}$ and held in a closed position by a shoulder or catch $a^{13}$ on a counterbalance weighted arm $a^{14}$ which extends from the door $a^{11}$ downwardly into the ash pit $a^{15}$. The door $a^{11}$ can be tilted to dump any ashes or other burned or unburned fuel that may accumulate thereover, by using a poker or other suitable rod through the ash-pit door $a^{16}$, to pull or swing the pendent, hinged arm $a^{14}$ forwardly, and thereby release its catch from the door $a^{11}$ and allow it to swing downwardly and discharge its contents into the ash-pit. The door $a^{11}$ is closed by swinging it upwardly, when its edge will strike the arm $a^{14}$ and force it back to allow the door to close and the arm to swing into position to again engage the catch $a^{13}$ and hold the door in its closed position.

Openings or flues $b'$ in rear of the bridge wall $c$ lead outwardly, one from each side of the combustion chamber, see Fig. 7, into the adjacent lower flue B′ and near the rear end thereof. The flues $b'$ are below the plates $a^7$ and are formed by a recess $b^2$ in the adjacent sides of two of the adjacent water legs or parts $a^3$, as shown at Figs. 4 and 5, and preferably the recesses to form one side or part of each flue $b'$ are in the same water-legs or parts $a^3$ with which the bridge walls $c^2$ are connected. Flue doors $b^3$ in the brick setting provide access to the flues B, B′, for cleaning them.

The furnace or heater as shown is in a brick work setting D, which incloses the main parts of the furnace, and on which the sections A, A′, A², are seated as shown. The brick work setting does not require particular description herein as it is but an accessory part of the furnace or heater, and may be used if preferred, or a metallic jacket may be used. The upper flues B communicate directly with the chimney D′ of the brick work, as shown at Fig. 3, and the lower flues B′ also communicate with said chimney, and are each provided with a hinged door $d$, which doors are operated simultaneously by a rod $d'$ that extends to the outer side or exterior of the brick work. The rod $d'$ has a crank arm $d^2$ at one end, (see Figs. 6 and 7,) by means of which it may be rocked or partially rotated in one direction to close the doors $d$ and cut off direct communication between the flues B′ and the chimney D′, as shown by full lines at Fig. 3, and rocked or partially rotated in an opposite direction to open the doors $d$, as shown by intermittent lines at same figure to establish direct communication between the flues B′ and chimney D′. The brick work setting forms the ash pit and chimney described. The grate $c'$ consists of ordinary rocking sections $c^3$, each section poised by its trunnions $c^4$ on metal bearing blocks $c^5$ which are bolted to pendants $c^6$ from the lower part of the water legs $a'$. The grate sections $c^3$ have each a pendent crank-arm $c^7$ and these crank arms are hinged to a connecting shake rod $c^8$, by means of which all of the sections of the grate may be simultaneously shaken.

E, E, are similar horizontal drums or pipes on opposite sides of the furnace or heater, preferably in about the same horizontal plane as the top of the parts $a^4$, and the interiors of the parts $a^4$ of each section $A^2$ are each connected by a pipe $e$ with the interior of the adjacent drum E. The lower part of the water space in the section A is connected at each side by a pipe $e'$ with the adjacent drum E, and the water space in the section A' is connected at its lower part and at each side of said section by a pipe $e^2$ with the adjacent drum E. One of the pipes $e^2$ is shown partly broken away at Fig. 3. Return pipes G, of which there may be any desired number proportioned to the capacity of the furnace or heater, enter the drums or pipes E. A pipe $e^3$ connects the interiors of the drums or pipes E with each other.

A drum H is supported lengthwise of the furnace or heater, and above the central portions of the sections A, A', $A^2$ by means of pipes $h$, one of which connects the water space of each section A, A', $A^2$ with the interior of the drum H, as shown at Fig. 4. The flow pipes or delivery pipes $h'$ of the pipe system communicate with the interior of the drum H. The water spaces of the sections A, A', $A^2$, not being directly connected with each other, bolt fastenings are not required to secure the sections together to prevent leakage between them. The capacity of the furnace or heater can be increased by adding sections $A^2$. The sections A, A', $A^2$ being separate, thus facilitate handling and transporting the furnace or heater, and especially facilitate passing it through door-ways and narrow passages, and the sections $A^2$ being in separate parts $a'$ and $a^2$ still further facilitate such handling. The heated gases of combustion in the combustion chamber $A^3$ are in contact with one side of the vertical water legs or pipes $a^3$, and the flame and other products of combustion passing rearward thereof and out through the openings or flues $b'$ to and through the revertible flues B' and thence through the openings $b$ and flues B to the chimney, when the doors $d$ are closed, thus bringing said products of combustion into contact with the other or opposite sides of said water legs, or pipes, $a^3$, so that the water therein will absorb a greater part of the effective heat of the gases, and thus generate in the vertical water legs $a^3$ a maximum of force to create and maintain a maximum of initial velocity of circulation of the water with a minimum consumption of fuel, for the reason that gravity acts vertically, and therefore force is best generated in vertical parts of a furnace or heater to create and maintain circulation of the water, and for the further reason that opposite sides of the vertical water legs or pipes $a^3$ are subjected to the action of the flame and other products of combustion, and that the flame is prevented centering at its upper part in the combustion chamber as in ordinary furnaces or heaters, and is spread and thrown against the vertical water legs $a^3$ in its lateral passage to the openings or flues $b'$ at both sides of the combustion chamber. The heated water in the water legs $a^3$ rising will pass through the pipes $a^9$, in which it will be subjected to further heat, and thence through the pendants $a^8$ and section tops $a^2$ where it will absorb further heat through the crown sheet or base of said section tops. The water passing through the pendants $a^8$ will be deflected by the plates $a^{10}$ around which it passes, and thereby thrown fully into contact with the base of the section tops $a^2$; but if preferred the plates $a^{10}$ may be dispensed with and the passage of the water from the pendants $a^8$ be thereby made more direct through the parts $a^2$ to the pipes $h$. From each top $a^2$ of a section $A^2$ and from the upper parts of the sections A and A' the water passes through its respective pipe $h$ to the drum H where it combines, and the temperature of the water from the different sections is equalized before it passes into ordinary delivery pipes or flow pipes $h'$ of any ordinary pipe system. The return water from the pipe system passing through the return pipes G into the drums E which are connected by the pipe $e^3$, is equalized in its temperature, and from each drum E, as shown at Fig. 4, passes into the adjacent part $a^4$ through its respective connecting pipe $e$ and into the adjacent side and lower part of the section A through the pipe $e'$, and into the adjacent side and lower part of the section A' through the pipe $e^2$. The return water to the sections $A^2$ is slightly heated in the return water legs or parts, $a^4$, by means of heat from the flues B, B', of which they form one side, whereby the return water is made to enter the lower ends of the water legs or pipes $a^3$ at such temperature that it will be rapidly raised in temperature in said water legs to the degree required, and thereby given a maximum of initial velocity for its circulation through the pipe system.

In kindling fires in the furnace or heater and at such other times as is necessary, the doors $d$ can be opened as shown by dotted lines at Fig. 5, to give a direct and more active draft from the combustion chamber through the openings or flues $b'$ and ends of the flues B' direct to the chimney.

Having thus described my invention, what I claim as new, and desire to secure by Letters Patent, is—

1. In a furnace or heater for hot water systems of heating, intermediate sections comprising in their structure and in combination, U-shaped side parts with their water spaces connected at their lower ends by a water space and non communicating at their upper ends, a top part having a water space, and a pipe or pipes connecting the water space of said top part with the adjacent leg only, of each side part.

2. In a furnace or heater for hot water systems of heating, intermediate sections comprising in their structure and in combination, U-shaped side parts with their water spaces connected at their lower ends by a water space and non communicating at their upper ends, a top part having a water space, a pipe or pipes connecting the water space of said top part with the adjacent leg only of each side part, and a partition located between the vertical water legs of each of said U-shaped side parts whereby the interspace between said legs is divided into upper and lower return flues.

3. In a furnace or heater for hot water systems of heating, intermediate sections comprising in their structure and in combination, U-shaped side parts with their water spaces connected at their lower ends by a water space and non communicating at their upper ends, a top part having a water space, a pipe or pipes connecting the water space of said top part with the adjacent leg only, of each side part, a partition $a^7$ located between the vertical water legs of each of said U-shaped side parts, dividing the interspace into an upper and lower return flue, a flue opening through the inner series or flow pipe water legs into the rear end of the lower flue, and a flue opening at the forward end of the partition $a^7$ whereby the upper and lower return flues communicate.

4. In a furnace or heater for hot water systems of heating, intermediate sections comprising in their structure and in combination, U-shaped side parts with their water spaces connected at their lower ends by a water space and non communicating at their upper ends, a top part having a water space, a pipe or pipes connecting the water space of said top part with the adjacent leg only, of each side part, a partition $a^7$ located between the vertical water legs of each of said U-shaped side parts, dividing the interspace into an upper and lower return flue, a flue opening through the inner series or flow pipe water legs into the rear end of the lower flue, a flue opening at the forward end of the partition $a^7$ whereby the upper and lower return flues communicate, and the drums E and H.

5. In a furnace or heater for hot water systems of heating, the combination with a series of intermediate sections, each comprising in its structure U-shaped side parts, a top part having a water space, a pipe or pipes connecting the water space of said top part with the direct flow pipe water leg of each side part, a partition between the water legs of each side part dividing the interspace into upper and lower return flues, a pipe connecting each top part of each section with the direct flow pipes of the water circulating system of pipes, a pipe connecting the return pipes of said system with the return flow leg of each section, an end section with a fire door, and an end section at the opposite end of the furnace, each of said end sections provided with a direct and a return flow pipe, substantially as described.

6. In a furnace or heater for hot water systems of heating, intermediate sections comprising in their structure and in combination, U-shaped side parts with their water spaces connected at their lower ends by a water space and non communicating at their upper ends, a top part having a water space, a pipe or pipes connecting the water space of said top part with the adjacent leg only of each side part, and a deflector plate $a^{10}$ located within the water space of said top part.

7. In a furnace or heater for hot water systems of heating, the combination with a series of intermediate sections, each comprising in its structure U-shaped side parts, a top part having a water space, a pipe or pipes connecting the water space of said top part with the flow pipe water leg of each side part, a partition between the water legs of each side part, a pipe connecting each top part of each section with the direct flow pipes of the water circulating system of pipes, a pipe connecting the return pipes of said system with the return flow legs of each section, an end section provided with a fire door, and with flue doors, and an end section at the opposite end of the furnace, each of said end sections provided with a direct and a return flow pipe, substantially as described.

8. In a furnace, or heater, for hot water systems of heating, and in combination substantially as hereinbefore described, intermediate sections $A^2$ formed of sub parts $a'$, $a^2$, $a^3$, $a^9$, end section A with a fire door and flue doors, end section A', pipes $h$ connecting the upper parts of the sections A, A', $A^2$ and the top $a^2$ with a drum H, which is connected with the flow pipes of the pipe system, pipes $e$ connecting the upper ends of the water legs $a^4$ with drums E which are connected with the return pipes of the pipe system, a pipe $e^3$ connecting the drums E, pipe $e'$ connecting the lower part of the section A with the drums E, pipes $e^2$ connecting the lower part of the section A' with the drums E.

9. In a furnace, or heater, for hot water systems of heating, and in combination substantially as hereinbefore described, sections $A^2$ formed of sub parts $a'$, $a^2$, $a^3$, $a^9$, section A, with fire doors and flue doors, section A' forming a fire back, grate $c'$, bridge wall $c$, tilting bottom $a^{11}$, valves $d$ and operating stems $d^2$, pipes $h$ connecting the upper parts of the sections A, A', $A^2$, and the top $a^2$ with a drum H, which is connected with the flow pipes of the pipe system, pipes $e$ connecting the upper ends of the water legs $a^4$ with drums E which are connected with the return pipes of the pipe system, a pipe $e^3$ connecting the drums E, pipe $e'$ connecting the lower part of the section A with the drums E, pipes $e^2$ connecting the lower part of the section A' with the drums E.

In testimony whereof I affix my signature in presence of two witnesses.

FREDERICK E. DACK.

Witnesses:
 RANDOLPH BOYD,
 WESLEY D. PATTY.